P. A. McHARDY.
MEANS FOR USE IN ATTACHING FENCING WIRES TO STANDARDS OR DROPPERS.
APPLICATION FILED JUNE 30, 1914.
1,162,628.
Patented Nov. 30, 1915.
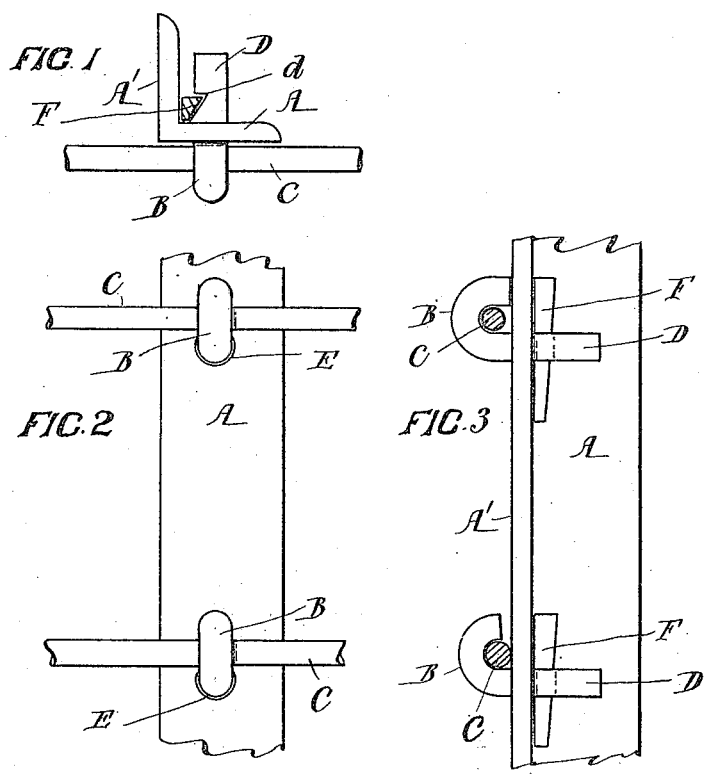

UNITED STATES PATENT OFFICE.

PERCY ALEXANDER McHARDY, OF BEAULIEU, PALMERSTON NORTH, NEW ZEALAND.

MEANS FOR USE IN ATTACHING FENCING-WIRES TO STANDARDS OR DROPPERS.

1,162,628.

Specification of Letters Patent. Patented Nov. 30, 1915.

Application filed June 30, 1914. Serial No. 848,155.

*To all whom it may concern:*

Be it known that I, PERCY ALEXANDER McHARDY, subject of the King of Great Britain, residing at Beaulieu, Palmerston North, New Zealand, have invented a new and useful Improved means for Use in Attaching Fencing-Wires to Standards or Droppers; and I do hereby declare the following to be a full, clear, and exact description of the same.

This invention has been designed in order to provide improved means whereby the wires of wire fencing may be attached to the standards or droppers employed in such fencing, in such a manner as to provide for the wires being locked against any movement, or to provide for the wire sliding freely within the fastening.

The means devised consist of hooks that are adapted to encircle the respective wires and the shank ends of which are then passed through holes in the standard or dropper and made fast. The length of the hook end may be such that it will engage with the face of the standard and while inclosing the wire within it, will leave such wire free to slide to and fro, or it may be such that when locked in position it will engage and hold the wire firmly between itself and the surface of the standard, and thereby prevent any movement of the wire.

The means devised for locking the hook in position consists of a wedge that is driven down at the back of the standard and engages between a shoulder formed on the hook shank and the back surface of the standard. This shoulder may be formed by cutting a groove in the shank side. In this case, the standard required will need to be of angle iron or other similar shape so as to provide a rib between which and the shank, the wedge will be held.

In the accompanying drawings:—Figure 1 is a plan of a dropper showing one manner of locking the hook thereto. Fig. 2 is a front elevation, and, Fig. 3 a side elevation of portion of the dropper length and illustrating the two methods of fastening the wires thereto.

A is the standard or dropper which when designed for use in conjunction with the manner of locking the hook thereto illustrated in Figs. 1 to 3 must be of a cross sectional shape such as to provide a rib or flange A' extending down its back. For instance the angle iron shape shown in Fig. 1 would be suitable.

B is the hook which is shaped at its end to surround the fencing wire C and has a long shank or stem D that is adapted to be passed through an aperture E formed in the front member of the dropper or standard and to project beyond the back face thereof.

In Figs. 1 and 3 the hook shank is shown as made with a notch $d$ in its side adjacent to the standard rib A' and a wedge F suitably shaped to fit into this notch and into the angle formed by the rib is provided. When this wedge is driven down it will draw the hook end in toward the front of the standard. This hook end is made either to engage the standard without gripping the wire as shown by the top illustration in Fig. 3 or to engage such wire and to draw it into close engagement with the standard, as shown by the lower illustration in Fig. 3. In both instances the hook is firmly locked by the wedging action, in the former, the wire being left free to slide within the hook while in the other it is locked from any movement.

What I do claim as my invention, and desire to secure by Letters Patent is:—

1. An attachment for wires comprising an angle-iron standard having an opening therein, a hook having a shank adapted to pass through said opening and having a notch forming a shoulder, and a wedge engaged by said shoulder and two adjacent faces of said standard.

2. In a means for attaching wires, the combination of an angle iron standard having an opening therein, a hook having a shank adapted to pass through said opening and having a notch, and a wedge engaged between the two faces of said angle-iron standard and said notch.

3. An attachment for fencing wires comprising an angle-iron standard having an opening therein, a hook having a shank adapted to pass through said opening and having an angular notch in the side thereof, and a wedge engaged by two faces of the angle iron standard and the sides of the notch.

In testimony whereof, I have signed this specification in the presence of two subscribing witnesses.

PERCY ALEXANDER McHARDY.

Witnesses:
FREDERICK WILLIAM JOHN OAKLEY,
EDWARD FRANCIS LEAMEY.